US010268044B1

(12) United States Patent
Spickermann et al.

(10) Patent No.: US 10,268,044 B1
(45) Date of Patent: Apr. 23, 2019

(54) THREE-DIMENSIONAL (3D) IMMERSIVE VIEWER SYSTEM

(71) Applicant: LOCKHEED MARTIN CORPORATION, Bethesda, MD (US)

(72) Inventors: Ralph Spickermann, Redwood City, CA (US); John Schooley Camp, San Francisco, CA (US); David Alan Smith, Cary, NC (US); Dragos Bogdan Maciuca, Mountain View, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 15/168,748

(22) Filed: May 31, 2016

Related U.S. Application Data

(60) Provisional application No. 62/168,021, filed on May 29, 2015.

(51) Int. Cl.
| G02B 3/08 | (2006.01) |
| G02B 27/02 | (2006.01) |
| G02B 27/22 | (2018.01) |

(52) U.S. Cl.
CPC ............ *G02B 27/2214* (2013.01); *G02B 3/08* (2013.01); *G02B 27/028* (2013.01); *G02B 27/2221* (2013.01)

(58) Field of Classification Search
CPC ........ G02B 27/2214; G02B 2027/0134; G02B 27/0101; G02B 27/22; G02B 27/0172; G02B 27/2242; G02B 2027/0178; G02B 27/01; G02B 27/2221; G02B 3/0037; G02B 6/0038; G02B 3/08; G02B 27/028

USPC .......................... 359/463, 462, 466, 467, 477
See application file for complete search history.

(56) References Cited

U.S. PATENT DOCUMENTS

| 1,520,311 | A | * | 12/1924 | Ruth | .................. | G02B 27/2242 235/146 |
| 1,808,176 | A | * | 6/1931 | Pieper | ................ | G02B 27/2228 359/473 |
| 2010/0277575 | A1 | * | 11/2010 | Ismael | ............... | G02B 27/2242 348/53 |
| 2012/0120498 | A1 | | 5/2012 | Harrison et al. | | |

(Continued)

FOREIGN PATENT DOCUMENTS

WO    WO 2012052981 A2 *  4/2012  ............... G02B 3/08

*Primary Examiner* — Jade R Chwasz
(74) *Attorney, Agent, or Firm* — Terry M. Sanks, Esq.; Beusse Wolter Sanks & Maire, PLLC

(57) ABSTRACT

Embodiments relate to an immersive viewer system and viewer housing. The system comprises a viewer housing having first and second viewing apertures and a device holder. The system includes a first set of Fresnel lenses in-line with the first viewing aperture and a second set of Fresnel lenses in-line with the second viewing aperture. The system may include a computing device having a generally rectangular profile with a narrow depth configured to be supported in the device holder such that a display screen of the computing device is directly viewable through the first and second viewing apertures. The first set and second set of Fresnel lenses bend a two-dimensional (2D) image displayed by the display screen to fully cover 180 degrees of a human field-of-view. The first and second sets of Fresnel lenses are configured to cause the 2D image to appear as a three-dimensional (3D) image.

20 Claims, 5 Drawing Sheets

(56) References Cited

U.S. PATENT DOCUMENTS

2012/0154920 A1 6/2012 Harrison et al.
2014/0375531 A1 12/2014 Latypov et al.

* cited by examiner

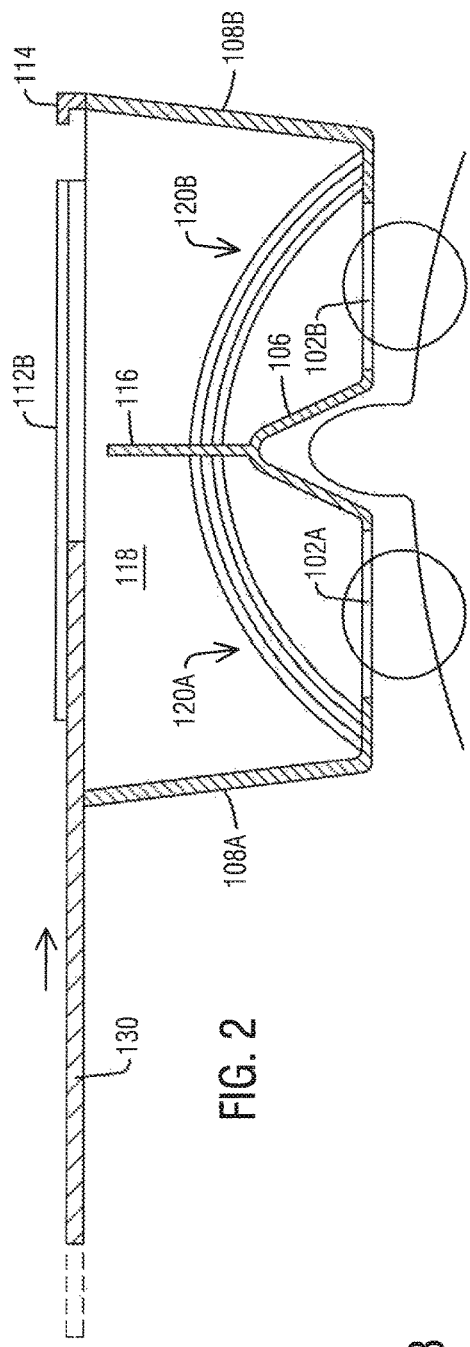
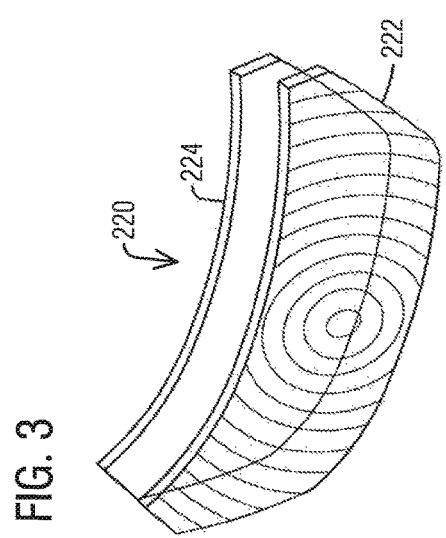

THREE-DIMENSIONAL (3D) IMMERSIVE VIEWER SYSTEM

CROSS-REFERENCE TO RELATED APPLICATIONS

This application claims the benefit of U.S. Provisional Application No. 62/168,021 filed May 29, 2015, and incorporated herein by reference in its entirety.

BACKGROUND

Embodiments relate to immersive viewing systems.

Sony's HMZ-T1 and HMZ-T2 personal viewers provide forty-five (45) degrees field-of-view (FOV), while the Google Glass only offers twenty (20) degrees FOV. Additionally, the cost of the Sony and Google technologies and larger FOV devices may be high due to the use of custom displays. At the other extreme, movies and television (TVs) can provide stereopsis, but do not provide the full 3D experience because of the lack of full immersion and motion simulation achieved by having a large FOV. Furthermore, such movie and television technology require either polarization or stroboscopic synchronization to achieve the 3D effect, thus again considerably increasing the cost of the system.

SUMMARY

Embodiments relate to an immersive viewer system and viewer housing. The system includes a viewer housing having first and second viewing apertures and a device holder. A first set of Fresnel lenses is in-line with the first viewing aperture. A second set of Fresnel lenses is in-line with the second viewing aperture. A computing device having a generally rectangular profile with a narrow depth is configured to be supported in the device holder such that a display screen of the computing device is directly viewable through the first and second viewing apertures. The first set and second set of Fresnel lenses bend a two-dimensional (2D) image displayed by the display screen to fully cover 180 degrees of a human field-of-view and the first and second sets of Fresnel lenses are configured to cause the 2D image to appear as a three-dimensional (3D) image.

An aspect of the embodiments includes a viewer housing comprising: a structure having a nose bridge, first and second viewing apertures along a front side and a device holder along a rear side to hold a tablet, smartphone or mobile computing device with a display, the nose bridge between the first and second viewing apertures. A first set of Fresnel lenses is in-line with the first viewing aperture. A second set of Fresnel lenses is in-line with the second viewing aperture. The first set and second set of Fresnel lenses bend a two-dimensional (2D) image displayed by the display to fully cover 180 degrees of a human field-of-view and the first and second sets of Fresnel lenses are configured to cause the 2D image to appear as a three-dimensional (3D) image.

Various refinements exist of the features noted in relation to the various aspects of the present invention. Further features may also be incorporated in the various aspects of the present invention. These refinements and additional features may exist individually or in any combination, and various features of the various aspects may be combined. These and other aspects and advantages of the present invention will be apparent upon review of the following "Detailed Description" section when taken in conjunction with the accompanying figures.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 2 illustrates a cross-sectional view of the 3D immersive viewing system with the tablet shown partially inserted;

FIG. 3 illustrates Fresnel lens sets for use in the 3D immersive viewing system;

DETAILED DESCRIPTION

Figure 1A:
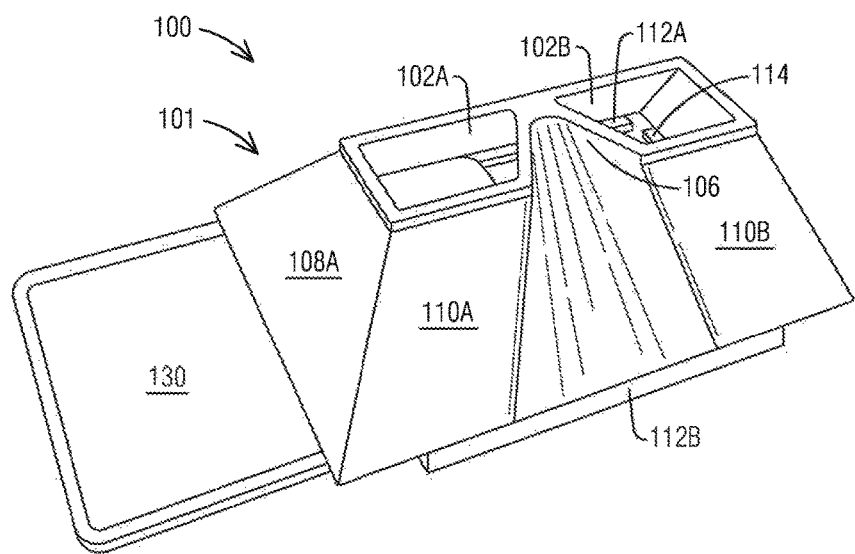
FIG. 1A is a front perspective view of a three-dimensional (3D) immersive viewing system with a tablet shown partially inserted.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Figure 1B:
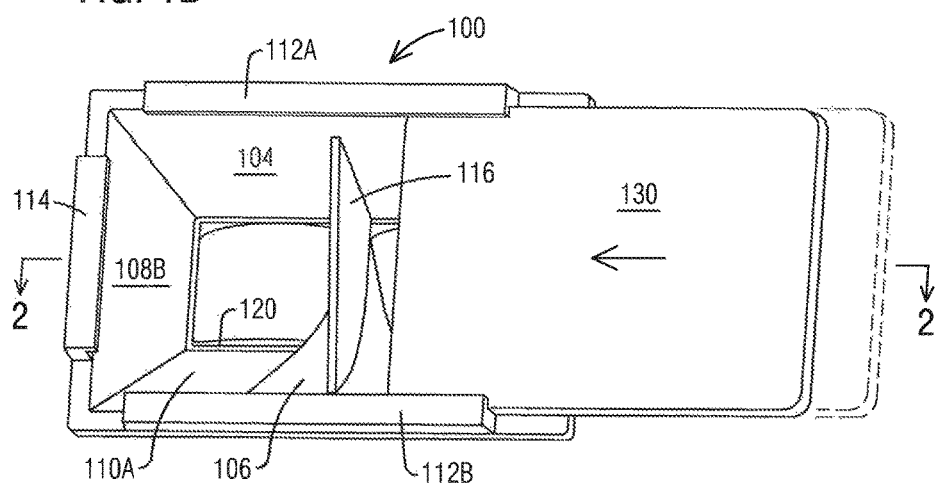
FIG. 1B illustrates a rear perspective view of the 3D immersive viewing system with the tablet shown partially inserted.

FIGS. 1A and 1B are front and rear perspective views of a three-dimensional (3D) immersive viewing system 100 with a tablet 130 shown partially inserted. FIG. 2 illustrates a cross-sectional view of system 100 with the tablet 130 partially inserted. The 3D immersive viewing system 100 includes a viewer housing 101, first and second sets of Fresnel lenses 120A and 120B (FIG. 2), and optionally a removable tablet 130 or other mobile computing device such as, without limitation, a smartphone. The system 100 is configured to allow 3D (e.g., with depth perception) viewing of two-dimensional (e.g., flat) images in an immersive environment. In FIG. 1B, a rear side of Fresnel lens 120 is shown.

The viewer housing 101 may include a shape that may resemble side-by-side quasi-frustum-shaped cavities wherein a width of a front side of housing 101 may be narrower than the width of a rear side of the housing 101, as illustrated in FIG. 2. The side-by-side quasi-frustum-shaped cavities are integrated at a nose bridge 106. The nose bridge 106 generally includes a first portion coupled to the first viewing aperture and a second portion coupled to the second viewing aperture, the first and second portions creating a V-shape profile having an apex to which the baffle wall 116 is attached or integrated. The baffle wall 116 extending rearward in a linear or straight manner. The baffle wall 116 being generally in a center of the structure of the viewer housing 101. The baffle wall 116 generally divides a portion of the interior chamber 118 in half. In some embodiments, the apex is rounded or squared to accommodate the shape of a nose.

The viewer housing 101 may include first and second side walls 108A and 108B which may be angled with respect to each other. By way of non-limiting example, the first and second side walls 108A and 108B may flare outward in a linear manner. The first and second side walls 108A and 108B may be generally trapezoidal shaped. The viewer housing 101 may include a top housing wall 104 which may be angled linearly such that the top housing wall flares or tapers upward. In some embodiments, the top housing wall 104 may be generally trapezoidal shaped.

The front side of the viewer housing 101 may include first and second viewing apertures 102A and 102B which may be side by side and separated by a nose bridge 106. The viewing apertures 102A and 102B may be generally square. In an embodiment, the side of the viewing apertures 102A and 102B immediately adjacent the nose bridge 106 may be angled.

The viewer housing 101 may include a baffle wall 116 which divides the interior chamber 118 of the viewer housing 101 into first and second viewing areas. The baffle wall 116 is essentially in a middle or center of the viewer housing 101 and creates a first lens area for the installation of the first set of Fresnel lenses 120A and a second lens area for the installation of the second set of Fresnel lenses 120B. In an embodiment, the Fresnel lenses may be curved. By way of non-limiting example, the Fresnel lenses may be curved around the side of an eye of the user or wearer. The illustration of the wearer eyes is shown slightly protruding into or through openings of the first and second viewing apertures 102A and 102B. However, the orientation of the viewer housing 101 is a function of the wearer placing the viewer housing 101 about their eyes and can vary. Thus, in some embodiments, the wearer eyes may not slightly protrude into or through the openings of the first and second viewing apertures 102A and 102B.

The first set of Fresnel lenses 120A has a first side coupled in proximity to a center of the viewer housing 101 and gradually curves forward such that a second side of the first set of Fresnel lenses is curved forward toward the first viewing aperture 102A. The first side of the first set of Fresnel lenses 120A is depicted as coupled to the baffle wall 116. However, the first side may be coupled to the nose bridge 106.

The second set of Fresnel lenses 120B has a first side coupled in proximity to the center of the viewer housing 101 and gradually curves forward such that a second side of the second set of Fresnel lenses is curved forward toward the second viewing aperture 102B. The first side of the second set of Fresnel lenses 120B is depicted as coupled to the baffle wall 116. However, the first side may be coupled to the nose bridge 106.

In some embodiments, the first and second sets of Fresnel lenses 120A and 120B may be bonded, fixed with an adhesive or glued.

The first quasi-frustum-shaped cavity houses the first set of Fresnel lenses 120A, as seen in FIG. 2. The first quasi-frustum-shaped cavity is defined by the area enclosed by a first viewing aperture 102A, the first side wall 108A, the baffle wall 116 merged with a portion of the nose bridge 106 closest to the first side wall 108A, bottom wall segment 110A, and that portion of the top housing wall 104 which overlaps the bottom wall segment 110A to the portion of nose bridge 106, the baffle wall 116, the first side wall 108A and the first viewing aperture 102A.

The second quasi-frustum-shaped cavity houses the second set of Fresnel lenses 120B, as seen in FIG. 2. The second quasi-frustum-shaped cavity is defined by the area enclosed by a second viewing aperture 102B, the second side wall 108B, the baffle wall 116 merged with a portion of the nose bridge 106 closest to the second side wall 108B, bottom wall segment 110B, and that portion of the top housing wall 104 which overlaps the bottom wall segment 110B to the portion of nose bridge 106, the baffle wall 116, the second side wall 108B and the second viewing aperture 102B.

The viewer housing 101 may include a display device or computing device holder. The device holder may support a tablet 130 or computing device such as a smartphone. The device holder may include a plurality of holder channels 112A, 112B and 114.

The holder channels 112A, 112B may be L-shaped channels to receive and support a computing device therein. The holder channel 112A may be positioned at the top housing wall 104 in proximity to a rear edge of wall 104. The holder channel 112B may be positioned at a bottom housing wall, formed by wall segments 110A and 110B in proximity to the rear edge thereof. The wall segments 110A and 110B may begin at a bottom edge of the first and second viewing aperture 102A and 102B, respectively, and are separated and integrated with a surface of the nose bridge 106.

The holder channel 114 may be in proximity to a rear edge of one of side walls 108A and 108B. The computing device, tablet or smartphone may have a generally rectangular profile with a narrow or thin depth. The channel widths may be configured to support the dimension of the narrow or thin depth of a tablet or smartphone.

Collectively, the holder channels 112A, 112B and 114 form a display device or computing device holder that allows a computing device or display device to be slid in and out of position. In such an embodiment, the tablet or smartphone can still be used without the viewing housing. Specifically, the holder channel 114 is shown on the rear edge of the second side wall 108B so that the tablet 130, computing device or smartphone is slid into the holder beginning from the rear edge of side wall 108A through holder channels 112A, 112B until holder channel 114 is reached. The holder channel 114 may provide a stop to prevent the tablet 130, computing device or smartphone from sliding past side wall 108B.

In an embodiment, the rear of the viewer housing 101 may be closed off by the tablet 130, computing device or smartphone in the device holder. Hence the interior chamber 118 of the viewer housing 101 is configured to be enclosed to create an immersive environment and limit light from entering the interior chamber 118.

In one embodiment, a display screen of the tablet 130, smartphone or computing device may be used as a display of a two-dimensional (2D) image or video. The first set of Fresnel lenses 120A may be associated with and in-line with the first viewing aperture 102A. The second set of Fresnel lenses 120B may be associated with and in-line with the second viewing aperture 102B. In an embodiment, each set of Fresnel lenses may include a set of aspherical Fresnel lenses to bend the image to fully cover the entire 180 degree human field-of-view. The set of Fresnel lenses includes at least two lenses per set. In an embodiment, there are two Fresnel lenses per set. However, there may be 3 or 4 lenses per set.

FIG. 3 illustrates Fresnel lens set 220 for use in the 3D immersive viewing system 100. The set 220 may include a first Fresnel lens 222 and a second Fresnel lens 224.

Based on the physiology of the eye, this is important for creating realistic 3D videos. The center of the retina contains the macula where the cones are located providing sharp central vision, color and details. Outside the macula, rods are responsible for peripheral vision and motion detection. For full 3D effect, both stereopsis (provided by the cones) and motion detection (provided by the rods) are necessary. This full field of view imager projects onto all the rods and cones which may give a full 3D effect.

The 3D immersive viewing system 100 provides full immersion stereopsis. The system takes advantage of the proliferation of tablets or smartphones and may create a full 3D experience through the use of a set of Fresnel lens.

As depicted, a tablet 130, smartphone or computing device may be engaged within a holder such that the display screen is facing the first and second sets of Fresnel lens 120A and 12B. In this regard, a user of the system 100 may view an image displayed on the display screen of the tablet 130, smartphone or computing device through the first and second sets of Fresnel lens 120A and 120B.

The first and second sets of Fresnel lens 120A and 120B may be designed to take a flat image and "bend" it around the eye such that the light rays reach the retina from straight forward to approximately ninety (90) degrees from the side (e.g., the left side of the left retina and the right side of the right retina) and approximately sixty (60) degrees from the top and sixty (60) degrees the from bottom, thus filling the entire human field of view. Aspect ratio distortion that may be caused by the first and second sets of Fresnel lens 120A and 120B may be mitigated by electronically pre-distorting the image on the display screen of the source tablet, smartphone or computing device such that it has the correct aspect ratio to the observer.

The 3D fully immersive tablet viewing system 100 may be personal viewing devices and 3D displays have been developed before; however, none has the field of view.

The tablet, smartphone or computing device may be configured to display a two-dimensional (2D) image or video and the first and second sets of Fresnel lenses may be configured to cause the 2D image or video to appear as a three-dimensional (3D) image or video.

Figure 4:
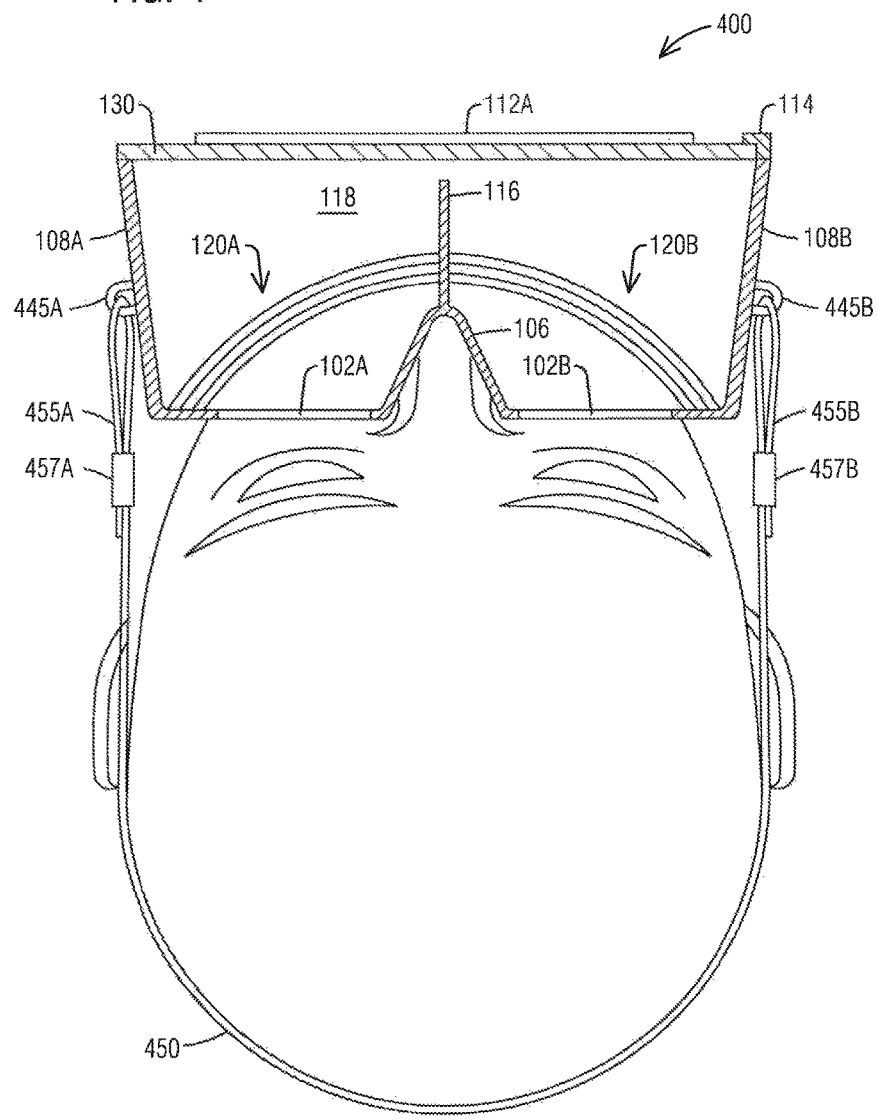
FIG. 4 illustrates a three-dimensional (3D) immersive viewing system with a head fastener.

FIG. 4 illustrates a three-dimensional (3D) immersive viewing system 400 with a head fastener 450. The system 400 is similar to system 100 as shown in FIGS. 1A, 1B and 2 above. Thus, only the differences will be described. System 400 may include a viewer housing (i.e., viewer housing 101 of FIG. 1A), first and second sets of Fresnel lenses 120A and 120B and optionally a removable tablet 130 or other mobile computing device such as, without limitation, a smartphone. The system 400 may further include head fastener 450 secured to the viewer housing at connectors 445A and 445B. The head fastener 450 may include a strap having free ends 455A and 455B which loop into connectors 445A and 445B, respectively. The free ends 455A and 455B are individually adjustable and secured by securing members 457A and 457B, respectively. In some embodiments, securing members 457A and 457B may include a buckle type fastener, or clamp fasteners. In some embodiments, the free ends 455A and 455B may be individually secured with securing members 457A and 457B using hook and loop fasteners, or snaps.

The connectors 445A and 445B are illustrated as eyelets. Nonetheless, the connectors 445A and 445B may include hook and loop fasteners. The connectors 445A and 445B may include rivets. Furthermore, in some embodiments, one of the free ends 445A or 445B may be permanently affixed to one of the connectors with the other free end being removably attached so that the head fastener 450 may be adjustably fit to the head of the wearer.

Figure 5:
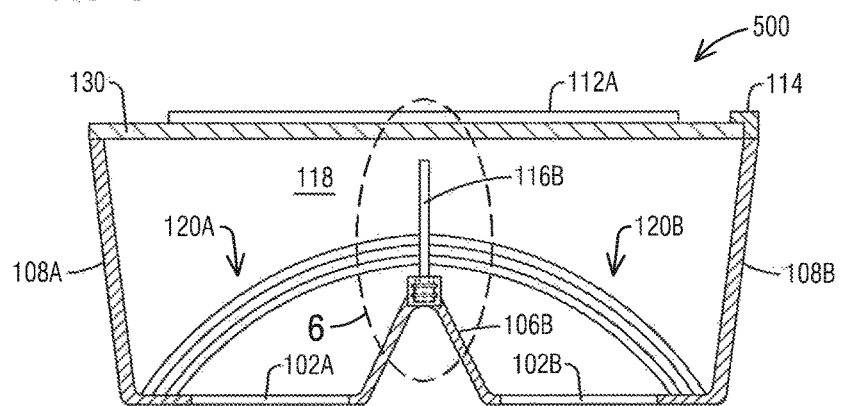
FIG. 5 illustrates a three-dimensional (3D) immersive viewing system with adjustable lenses.

FIG. 5 illustrates a three-dimensional (3D) immersive viewing system 500 with adjustable lenses 120A and 120B. The system 500 is similar to system 100 as shown in FIGS. 1A, 1B and 2 above. The features of system 500 may be incorporated in system 400. Thus, only the differences will be described. System 500 may include a viewer housing (i.e., viewer housing 101 of FIG. 1A), first and second sets of Fresnel lenses 120A and 120B and optionally a removable tablet 130 or other mobile computing device such as, without limitation, a smartphone.

The viewer housing 101 may include a removable baffle wall 116B which divides the interior chamber 118 of the viewer housing 101 into first and second viewing areas. The removable baffle wall 116B may have coupled thereto first and second sets of Fresnel lenses 120A and 120B.

In some embodiments, the baffle wall 116B may be adjustably coupled in or to baffle connector 117.

Figure 6:
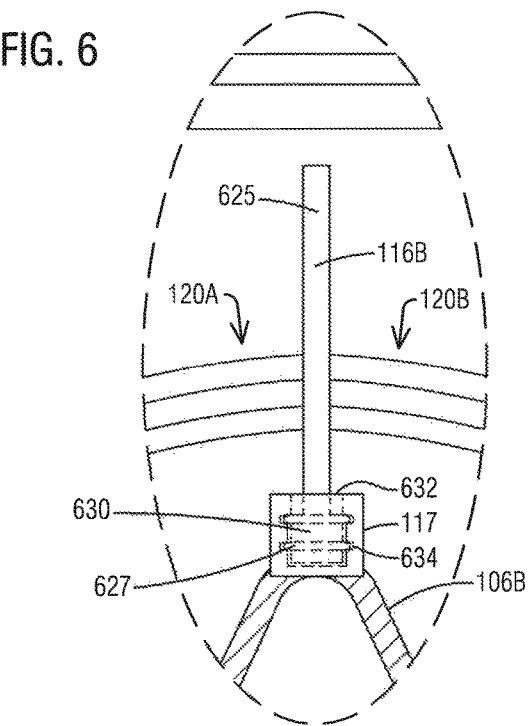
FIG. 6 illustrates a detailed view of a circled area in FIG. 5.

FIG. 6 illustrates a detailed view of a circled area 6 in FIG. 5 which depicts the detail of the baffle wall 116B to baffle connector 117. In some embodiments, the baffle wall 116B may be snapped into the viewer housing 101 so that the first and second sets of Fresnel lenses 120A and 120B are installed and secured in the viewer housing 101.

In some embodiments, the baffle connector 117 may allow the distance of the first and second sets of Fresnel lenses 120A and 120B to be adjusted.

The baffle wall 116B has an end, side or edge which is adapted to be slid into and secured in baffle connector 117. The baffle wall 116B may include ribs 634 on the connecting edge 630 of wall 116B. The baffle connector 117 may include a hollow interior channel 632 with grooves 627 to which a rib 634 will engage or snap into a groove 627. While a snap-on connection is shown, other connection mechanisms may be used such as friction fit couplings between the connecting edge 630 of the baffle wall 116B and the baffle connector 117. While not shown, in some embodiments, the baffle wall 116B may be fastened in position via a screw through the viewer housing 101. In other embodiments, the baffle wall 116B may be bonded with an adhesive applied in or to the baffle connector 117.

In the illustration, the baffle wall 116B is shown at a location which orients the first and second sets of Fresnel lenses 120A and 120B closest to the first and second viewing apertures 102A and 102B. Sliding the baffle wall 116B rearward and unsnapping the rib 634 from grooves 627 closest to the nose bridge 106B would change the location of the first and second sets of Fresnel lenses 120A and 120B to be farther from the first and second viewing apertures 102A and 102B such that the rib 634 at the farthest edge of the connecting edge 630 may be snapped into the grooves closest to the opening into the hollow interior channel 632.

In the illustrations, only two positions are shown. However, the baffle connector 117 may include 2 or more grooves, to vary the degree from which the first and second sets of Fresnel lenses 120A and 120B may be distanced from the eyes of the user.

In some embodiments, the removability of baffle wall 116B allows the first and second sets of Fresnel lenses 120A and 120B to be interchanged or replaced.

Figure 7:
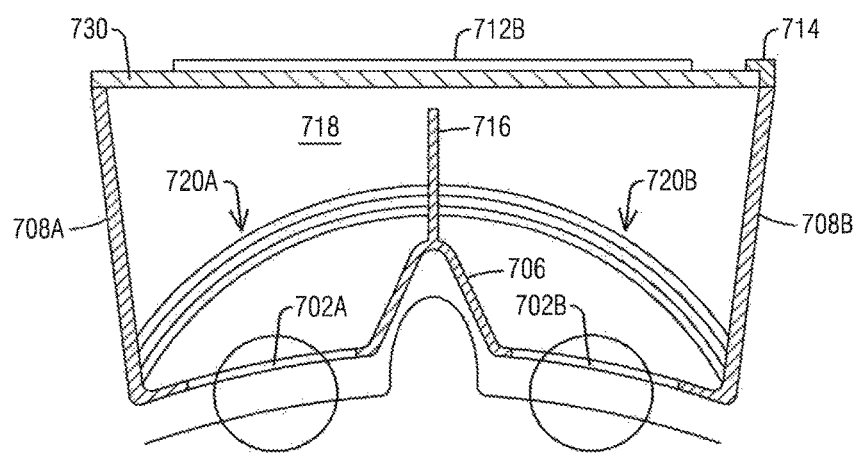
FIG. 7 illustrates a cross-sectional view of yet another 3D immersive viewing system.

FIG. 7 illustrates a cross-sectional view of yet another 3D immersive viewing system. The viewer housing is similar to the viewer housing of FIGS. 1A, 1B and 2, thus only differences will be described. In this embodiment, the first viewing aperture 702A and specifically the front side of the viewer housing may be slightly curved from the nose bridge 706 forward to the side wall 708A. The second viewing aperture 702B and specifically the front side of the viewer housing may be slightly curved from the nose bridge 706 forward to the side wall 708B. The curvature of the front side in the area of the first viewing aperture 702A may curve around the left eye or face. Likewise, the curvature of the front side in the area of the second viewing aperture 702B may curve around the right eye or face.

The first set of Fresnel lenses 720A has a first side coupled in proximity to a center of the viewer housing and gradually curves forward such that a second side of the first set of Fresnel lenses is curved forward toward the corner formed by the first viewing aperture 702A and the first side wall 708A. The first side of the first set of Fresnel lenses 720A is depicted as coupled to the baffle wall 716. However, the first side may be coupled to the nose bridge 706. The curvature is concaved along the path from the corner defined by nose bridge 706 and the front side by the first viewing aperture to the corner formed by the first viewing aperture 702A and the first side wall 708A.

The second set of Fresnel lenses 720B has a first side coupled in proximity to the center of the viewer housing and gradually curves forward such that a second side of the second set of Fresnel lenses 720B is curved forward toward the corner formed by the second viewing aperture 702B and the second side wall 708B. The first side of the second set of Fresnel lenses 720B is depicted as coupled to the baffle wall 716. However, the first side may be coupled to the nose bridge 706. The curvature is concaved along the path from the corner defined by nose bridge 706 and the front side by the second viewing aperture to the corner formed by the second viewing aperture 702B and the second side wall 708B.

In the illustrations, when the viewer housing is placed about the eyes of the user, the first and second set of Fresnel lenses 720A and 720B are shown curved or bent around outer perimeter of the eyes of the user. In this embodiment, a portion of the eyes are not required to pass through the opening of the first and second viewing aperture 702A and 702B for the first and second set of Fresnel lenses 720A and 720B to curve or bend around the eyes of the user.

The viewer housing may include a device holder. The device holder may support a tablet 730 or computing device such as a smartphone. The device holder may include a plurality of holder channels (only 712B and 714 shown).

The baffle wall 716 is generally in a center of the structure of the viewer housing. The baffle wall 716 generally divides a portion of the interior chamber 718 and the light between the divided interior chamber 718 from the tablet 730.

In some embodiments, the tablet, computing device or smartphone may be replaced by a display device having a display screen dimensioned to fit within the device holder and extend substantially across the rear opening both vertically and horizontally. The display device may display on a display screen a 2D image or 2D video. The display device may be in communication via wired or wireless communications with a personal computer (PC), laptop, tablet or other computing device.

In some embodiments, the device holder may hold and support two display devices, tablets, smartphone or computing device to provide two side-by-side display screens, one for each eye. The size of the display screen whether one screen or two screens should be maximized to provide the widest field-of-view (FOV) possible.

In some embodiments, the device holder may be configured to hold and support the two display devices, tablets, smartphones or computing devices at a slight angle. The slight angle of display screen of the two display devices, tablets, smartphones or computing devices may provide an improved surround image, a wide FOV or panoramic view. In other words, the first display screen may display a first FOV of a 2D image; the second display screen may display a second FOV of a 2D image; and collectively, the first and second display screens may display a 3D panoramic or a 3D surround image. By way of example, the device holder may eliminate channel 114 or 714 so that a first device with a first display screen can be slid from the right into the holder toward the center, and a second device with a second display screen can be slid from left into the holder toward the center. For angled displays, the device holder would be contoured to create the angle and support the display screens.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

What is claimed is:

1. An immersive viewer system comprising:
    a viewer housing having an interior chamber with an inner surface, a first and second viewing apertures and a device holder;
    an adjustable baffle wall within the interior chamber and coupled to the inner surface of the viewer housing to define a first viewing area within the interior chamber associated with the first viewing aperture and a second viewing area within the interior chamber associated with the second viewing aperture wherein the adjustable baffle wall is moveable at least one of towards and away from the first and second viewing apertures;
    a first set of Fresnel lenses in-line with and in between the first viewing aperture and the device holder with a first side attached to the adjustable baffle wall within the interior chamber;
    a second set of Fresnel lenses in-line with and in between the second viewing aperture and the device holder with a first side attached to the adjustable baffle wall within the interior chamber; and
    a computing device having a generally rectangular profile with a narrow depth configured to be supported in the device holder such that a display screen of the computing device is directly viewable through the first and second viewing apertures wherein the first set and second set of Fresnel lenses bend a two-dimensional (2D) image displayed by the display screen to fully cover 180 degrees of a human field-of-view and the first and second sets of Fresnel lenses are configured to cause the 2D image to appear as a three-dimensional (3D) image;
    wherein a distance of the first set of Fresnel lenses to the first viewing aperture and a distance of the second set of Fresnel lenses to the second viewing aperture are adjustable when the baffle wall is moved at least one of towards and away from the first and second viewing apertures.

2. The system of claim 1, wherein in the first and second sets of Fresnel lenses each includes at least two Fresnel lenses; wherein the at least two Fresnel lenses of the first set of Fresnel lenses gradually curve such that a second side of the first set of Fresnel lenses is curved forward toward the first viewing aperture; and the at least two Fresnel lenses of the second set of Fresnel lenses gradually curve such that a second side of the second set of Fresnel lenses is curved forward toward the second viewing aperture.

3. The system of claim 2, wherein the first and second sets of Fresnel lenses include aspherical Fresnel lenses.

4. The system of claim 1, wherein the viewer housing includes a nose bridge between the first and second viewing apertures to which the adjustable baffle wall attaches.

5. The system of claim 1, wherein a width of a front side of the viewer housing along a plane of the first and second viewing apertures is narrower than a rear side of the viewer housing.

6. The system of claim 1, wherein the rear side of the viewer housing is closed off by the computing device.

7. The system of claim 1, wherein the computing device is a tablet or a smartphone.

8. The system of claim 1, wherein the viewer housing comprises a nose bridge having a first portion coupled to the first viewing aperture and a second portion coupled to the second viewing aperture, the first and second portions creating a V-shape profile having:
    an apex, wherein the adjustable baffle wall is attached at the apex of the nose bridge within the interior chamber and extends from the apex in a direction of the device holder;
    a first side wall;
    a second side wall;
    a first bottom wall segment;
    a second bottom wall segment;
    a top wall which overlaps the first bottom wall segment and the second bottom wall segment;
    a first quasi-frustum-shaped cavity of the interior chamber housing therein the first set of Fresnel lenses, the first quasi-frustum-shaped cavity defined by an area enclosed by the first viewing aperture, the first side wall, the baffle wall merged with the first portion of the nose bridge closest to the first side wall, the first bottom wall segment, and that portion of the top housing wall which overlaps the first bottom wall segment to the first portion of nose bridge, the baffle wall, the first side wall and the first viewing aperture; and
    a second quasi-frustum-shaped cavity of the interior chamber housing therein the second set of Fresnel lenses, the second quasi-frustum-shaped cavity defined by an area enclosed by the second viewing aperture, the second side wall, the baffle wall merged with the second portion of the nose bridge closest to the second side wall, the second bottom wall segment, and that portion of the top housing wall which overlaps the second bottom wall segment to the second portion of nose bridge, the baffle wall, the second side wall and the second viewing aperture.

9. The system of claim 1, further comprising a baffle connector through which the baffle wall is coupled to the inner surface of the viewer housing.

10. The system of claim 9, wherein the baffle wall comprises an end, with an engaging mating surface, that fits into and is secured in the baffle connector, that has a second receiving mating surface.

11. A viewer housing comprising:
    a structure having a nose bridge, an interior chamber, an adjustable baffle wall attached to the nose bridge and being within the interior chamber, first and second viewing apertures along a front side and a device holder along a rear side to hold a tablet, smartphone or mobile computing device with a display, the nose bridge between the first and second viewing apertures;
    a first set of Fresnel lenses in-line with and in between the first viewing aperture and the device holder and attached to the adjustable baffle wall at a first side so that as the adjustable baffle is adjusted, a distance of the first set of Fresnel lenses to the first viewing aperture is changed within the interior chamber, and a second set of Fresnel lenses in-line with and in between the second viewing aperture and the device holder and attached to the adjustable baffle wall at a first side so that as the adjustable baffle wall is adjusted, a distance of the second set of Fresnel lenses to the second viewing aperture is changed within the interior chamber;

wherein the first set and second set of Fresnel lenses bend a two-dimensional (2D) image displayed by the display to fully cover 180 degrees of a human field-of-view and the first and second sets of Fresnel lenses are configured to cause the 2D image to appear as a three-dimensional (3D) image.

12. The viewer housing of claim 11, wherein the first and second sets of Fresnel lenses each include at least two Fresnel lenses; wherein the at least two Fresnel lenses of the first set of Fresnel lenses gradually curve such that a second side of the first set of Fresnel lenses is curved forward toward the first viewing aperture; and the at least two Fresnel lenses of the second set of Fresnel lenses gradually curve such that a second side of the second set of Fresnel lenses is curved forward toward the second viewing aperture.

13. The viewer housing of claim 12, wherein the first and second sets of Fresnel lenses include aspherical Fresnel lenses.

14. The viewer housing of claim 11, wherein a width of a front side of the viewer housing along a plane of the first and second viewing apertures is narrower than a width of a rear side of the viewer housing.

15. The viewer housing of claim 11, wherein the rear side of the viewer housing is configured to be closed off by the tablet, the smartphone or the mobile computing device.

16. The viewer housing of claim 11, wherein the nose bridge includes a first portion coupled to the first viewing aperture and a second portion coupled to the second viewing aperture, the first and second portions creating a V-shape profile having an apex to which the adjustable baffle wall is merged with within the interior chamber and extends from the apex in a direction of the device holder; and the structure further comprising:
 a first side wall;
 a second side wall;
 a first bottom wall segment;
 a second bottom wall segment;
 a top wall which overlaps the bottom wall segment and the second bottom wall segment;
 a first quasi-frustum-shaped cavity of the interior chamber housing therein the first set of Fresnel lenses, the first quasi-frustum-shaped cavity defined by an area enclosed by the first viewing aperture, the first side wall, the baffle wall merged with the first portion of the nose bridge closest to the first side wall, the first bottom wall segment, and that portion of the top housing wall which overlaps the first bottom wall segment to the first portion of nose bridge, the baffle wall, the first side wall and the first viewing aperture; and
 a second quasi-frustum-shaped cavity of the interior chamber housing therein the second set of Fresnel lenses, the second quasi-frustum-shaped cavity defined by an area enclosed by the second viewing aperture, the second side wall, the baffle wall merged with the second portion of the nose bridge closest to the second side wall, the second bottom wall segment, and that portion of the top housing wall which overlaps the second bottom wall segment to the second portion of nose bridge, the baffle wall, the second side wall and the second viewing aperture.

17. The viewer housing of claim 16, wherein the viewer housing is an immersive viewer housing.

18. The viewer housing of claim 16, wherein the 2D image comprises 2D video and the 3D image comprises 3D video.

19. The viewer housing of claim 11, further comprising a baffle connector through which the baffle wall is coupled to the inner surface of the viewer housing.

20. An immersive viewer system comprising:
 a viewer housing having an interior chamber, an inner surface within the interior chamber, a first and second viewing apertures and a device holder;
 an adjustable baffle wall coupled to the inner surface of the viewer housing and generally centered between the first and second viewing apertures to define a viewing area within the interior chamber associated with at least one of the first and the second viewing apertures, wherein the adjustable baffle wall is moveable at least one of towards and away within the interior chamber from at least one of the first and second viewing apertures;
 at least one of a first set of Fresnel lenses in-line with and in between the first viewing aperture and the device holder with a first side attached to the adjustable baffle wall within the interior chamber and a second set of Fresnel lenses in-line with and in between the second viewing aperture and the device holder with a first side attached to the adjustable baffle wall within the interior chamber; and
 a computing device having a generally rectangular profile with a narrow depth configured to be supported in the device holder such that a display screen of the computing device is directly viewable through the first and second viewing apertures wherein the first set and second set of Fresnel lenses bend a two-dimensional (2D) image displayed by the display screen to fully cover 180 degrees of a human field-of-view and the first and second sets of Fresnel lenses are configured to cause the 2D image to appear as a three-dimensional (3D) image;
 wherein a distance of at least one of the first set of Fresnel lenses from the first viewing aperture and the second set of Fresnel lenses from the second viewing aperture is adjustable when the baffle wall is moved at least one of towards and away from at least one of first and second viewing apertures.

* * * * *